(12) United States Patent
Horng

(10) Patent No.: US 6,179,561 B1
(45) Date of Patent: Jan. 30, 2001

(54) FAN WHEEL STRUCTURES

(75) Inventor: Alex Horng, Kaohsiung (TW)

(73) Assignee: Sunonwealth Electric Machine Industry Co., Ltd., Kaohsiung (TW)

( * ) Notice: Under 35 U.S.C. 154(b), the term of this patent shall be extended for 0 days.

(21) Appl. No.: 09/203,744

(22) Filed: Dec. 2, 1998

(51) Int. Cl.$^7$ .................................................. F04B 17/03
(52) U.S. Cl. ...................... 415/208.3; 415/175; 415/177; 415/208.3; 415/211.1; 361/687; 361/688; 361/694; 361/695
(58) Field of Search .................................... 415/175, 176, 415/177, 178, 204, 208.3, 211.1, 211.2, 213.1, 214.1; 361/687, 688, 694, 695, 697, 696; 417/354, 423.14, 423.15

(56) References Cited

U.S. PATENT DOCUMENTS

| | | | |
|---|---|---|---|
| 5,513,951 | * 5/1996 | Komoda et al. ...................... | 415/119 |
| 5,699,854 | * 12/1997 | Hong .................................. | 1656/121 |
| 5,816,319 | * 10/1998 | Kamekawa et al. .................. | 165/121 |
| 5,879,141 | * 3/1999 | Yokozawa et al. ............... | 417/423.7 |
| 5,979,541 | * 11/1999 | Saito .................................... | 165/80.3 |

FOREIGN PATENT DOCUMENTS 324798   2/1998  (CH) .

OTHER PUBLICATIONS

U.S. application No. 09/213,891, filed Dec. 17, 1998.
Applicant's comments on Taiwan Publication No. 324798.

* cited by examiner

Primary Examiner—F. Daniel Lopez
Assistant Examiner—James M McAleenan
(74) Attorney, Agent, or Firm—Stevens, Davis, Miller & Mosher, L.L.P.

(57) ABSTRACT

A fan wheel includes a main body and an axle connected to a center of the main body. The main body includes a peripheral wall provided around an axial axis thereof. A number of upper blades and lower blades are mounted to the peripheral wall. Each upper blade extends in a direction at an angle with the axial axis, while each lower blade extends in a direction substantially parallel to the axial axis. When the main body rotates, the axial blades drive air along the axial axis, and the blower blades drive air along a plane perpendicular to the axial axis.

17 Claims, 11 Drawing Sheets

US 6,179,561 B1

FAN WHEEL STRUCTURES

BACKGROUND OF THE INVENTION

1. Field of the Invention

The present invention relates to fan wheel structures, and more particularly to fan wheel structures having axial blades and blower blades.

2. Description of the Related Art

A wide variety of fan wheels for miniature heat dissipating fans have heretofore been provided. Conventional fan wheels include two types: axial type and blower type. An axial type fan wheel includes axial blades each extended in a direction that has an angle with an axial direction for driving air along the axial direction. A blower type fan wheel includes blower blades each extended in a direction parallel to the axial direction for driving air in a plane perpendicular to the axial direction. When using a miniature heat dissipating fan with axial blades for cooling a circuit board or the like, cool air is accumulated on the surface of the circuit board and then forced to expand outward along a plane perpendicular to the axial direction. In this case, hot air as a result of absorbing heat generated by the circuit board will move upwardly and thus causes an obstruct to the outward expansion of the cool air. As a result, the heat dissipating function is adversely affected. When using a miniature heat dissipating fan with blower blades for cooling a circuit board or the like, cool air is driven along the plane perpendicular to the axial direction. In this case, hot air as a result of absorbing heat generated by the circuit board that moves upwardly is also driven along the plane perpendicular to the axial direction. The upwardly moving hot air encounters and thus adversely affects the cooling effect of cool air that moves downwardly to the surface of the circuit board.

The present invention is intended to provide improved fan wheels for miniature heat dissipating fans to solve the above problems.

SUMMARY OF THE DRAWINGS

It is a primary object of the present invention to provide an improved fan wheel for miniature heat dissipating fans; the fan wheel may simultaneously drive air along an axial direction and a plane perpendicular to the axial direction, thereby providing a better heat dissipating effect.

A fan wheel in accordance with the present invention includes a main body and an axle connected to a center of the main body. The main body includes a peripheral wall provided around an axial axis thereof. A number of upper blades and lower blades are mounted to the peripheral wall. Each upper blade extends in a direction at an angle with the axial axis, while each lower blade extends in a direction substantially parallel to the axial axis. When the main body rotates, the axial blades drive air along the axial axis, and the blower blades drive air along a plane perpendicular to the axial axis.

Each upper blade may be connected to or separate from an associated lower blade. The upper blades and the lower blades may be alternately disposed. Preferably, each upper blade is arcuate.

In a preferred embodiment of the invention, the upper blades are located below an air inlet of a heat dissipating device, while the lower blades are located adjacent to an air outlet of the heat dissipating device. In operation, the upper blades drive ambient cool air along an axial axis via the air inlet to a place adjacent to the lower blades. Then, the lower blades drive air along a plane perpendicular to the axial axis to exit the air outlet, thereby providing a better convection effect for heat dissipation.

Other objects, advantages, and novel features of the invention will become more apparent from the following detailed description when taken in conjunction with the accompanying drawings.

BRIEF DESCRIPTION OF THE DRAWINGS

Figure 1:
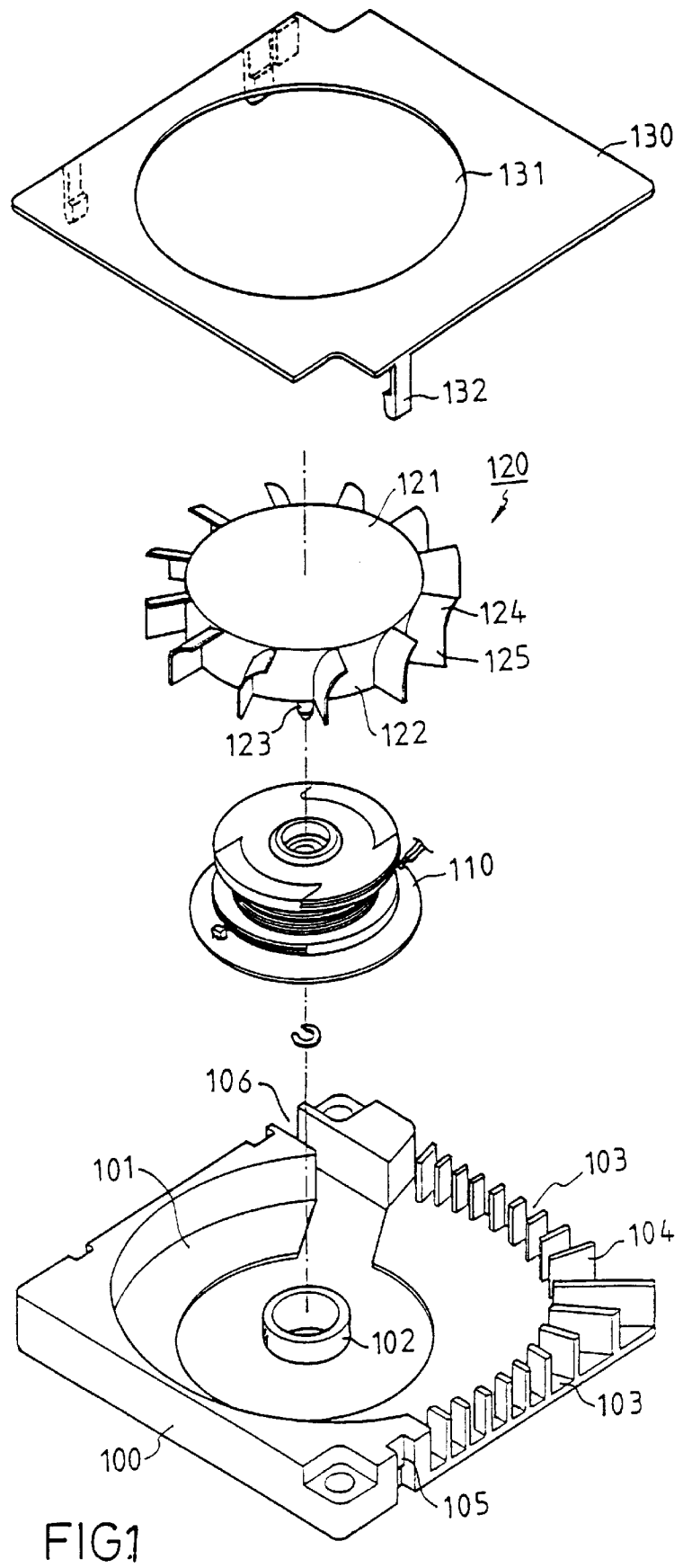
Figure 2:
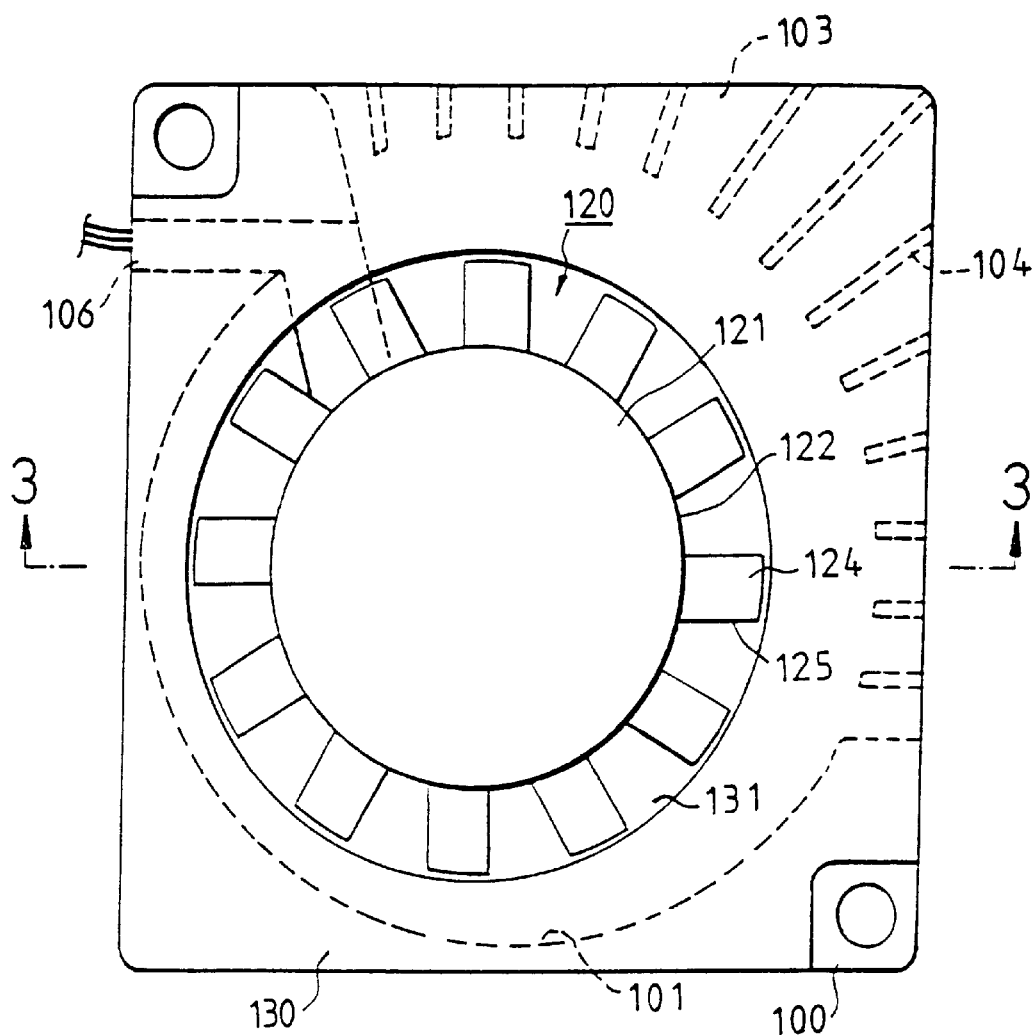
Figure 3:
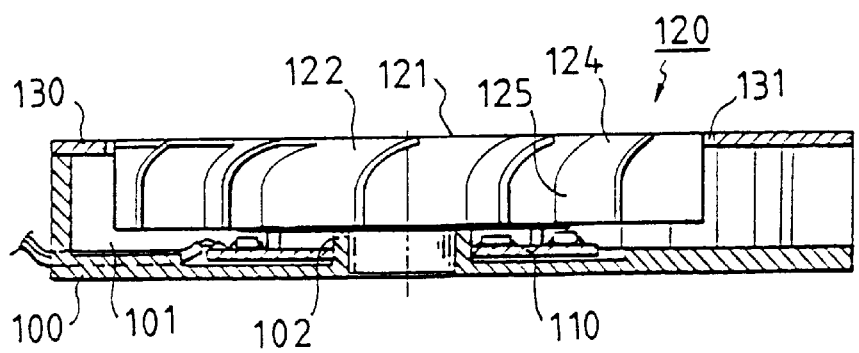
Figure 4:
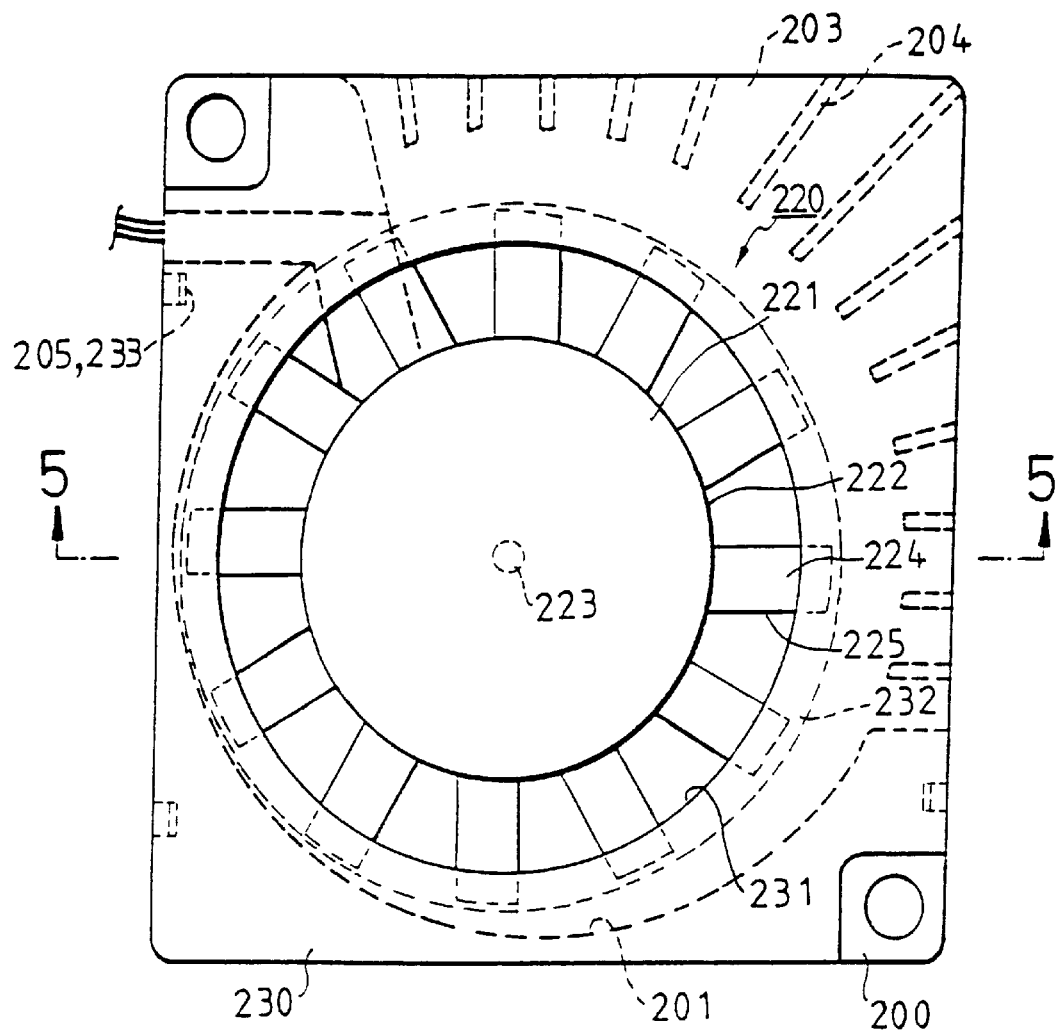
Figure 5:
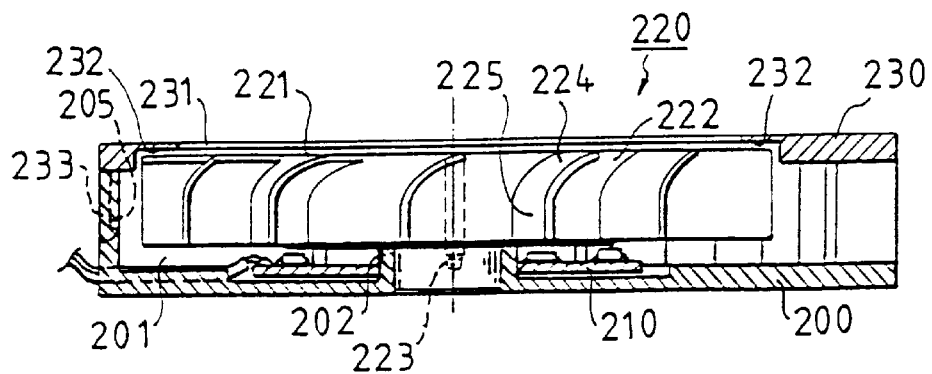
Figure 6:
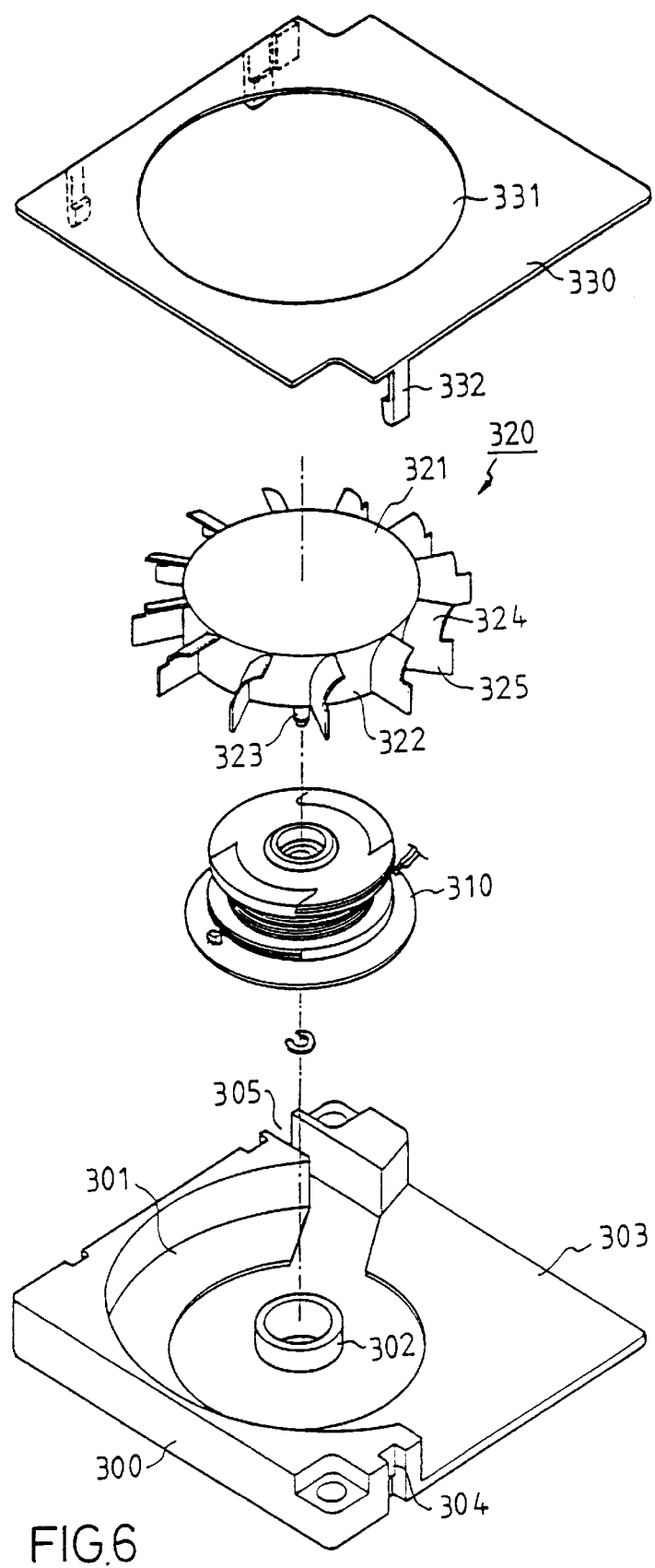
Figure 7:
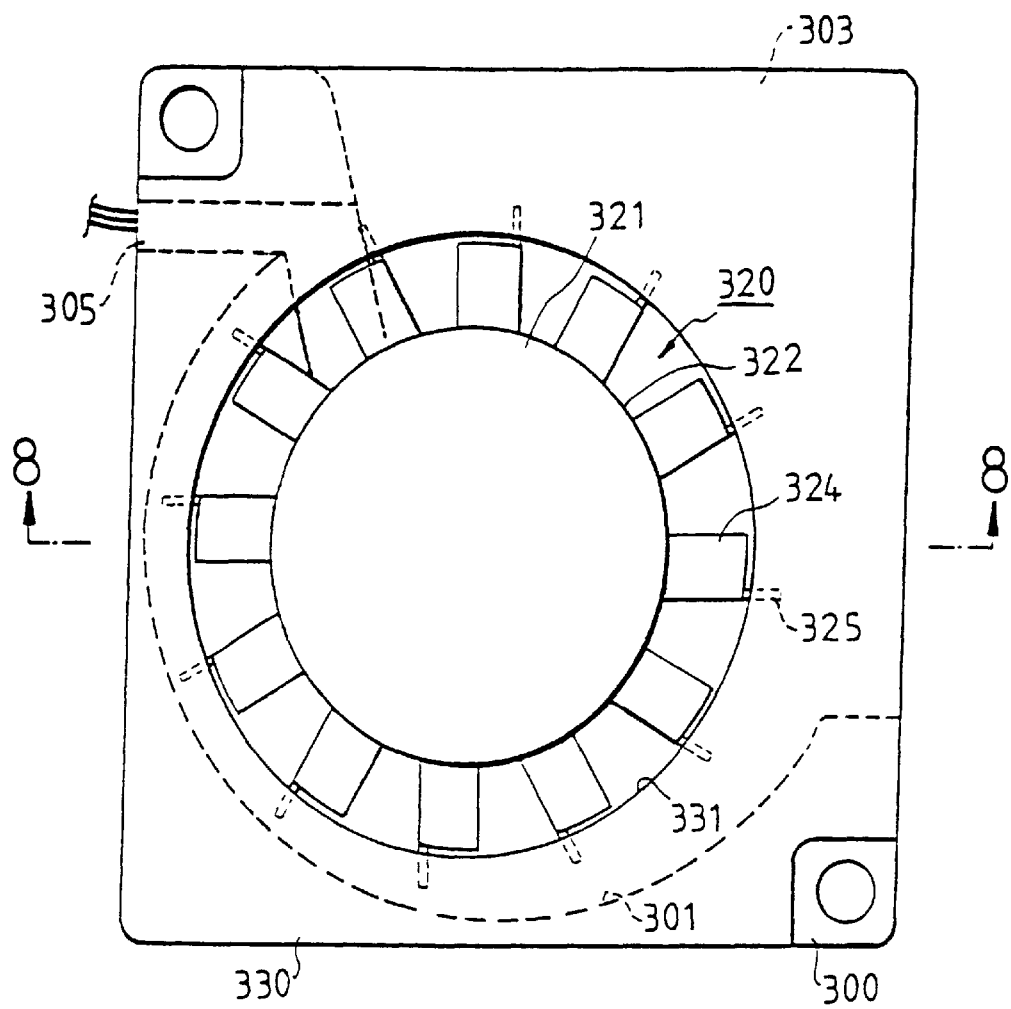
Figure 8:
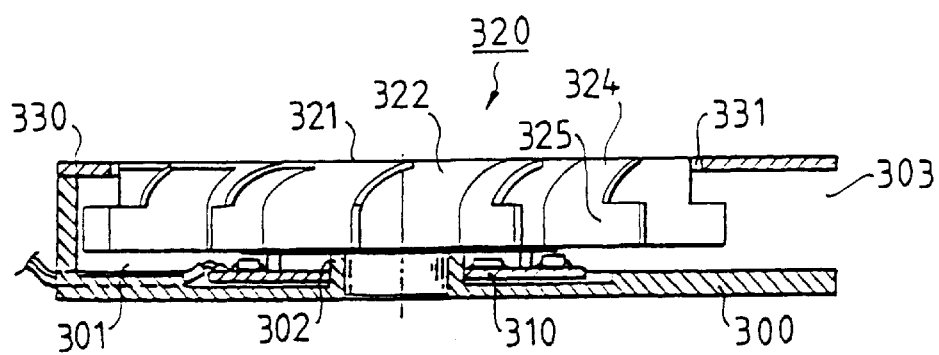
Figure 9:
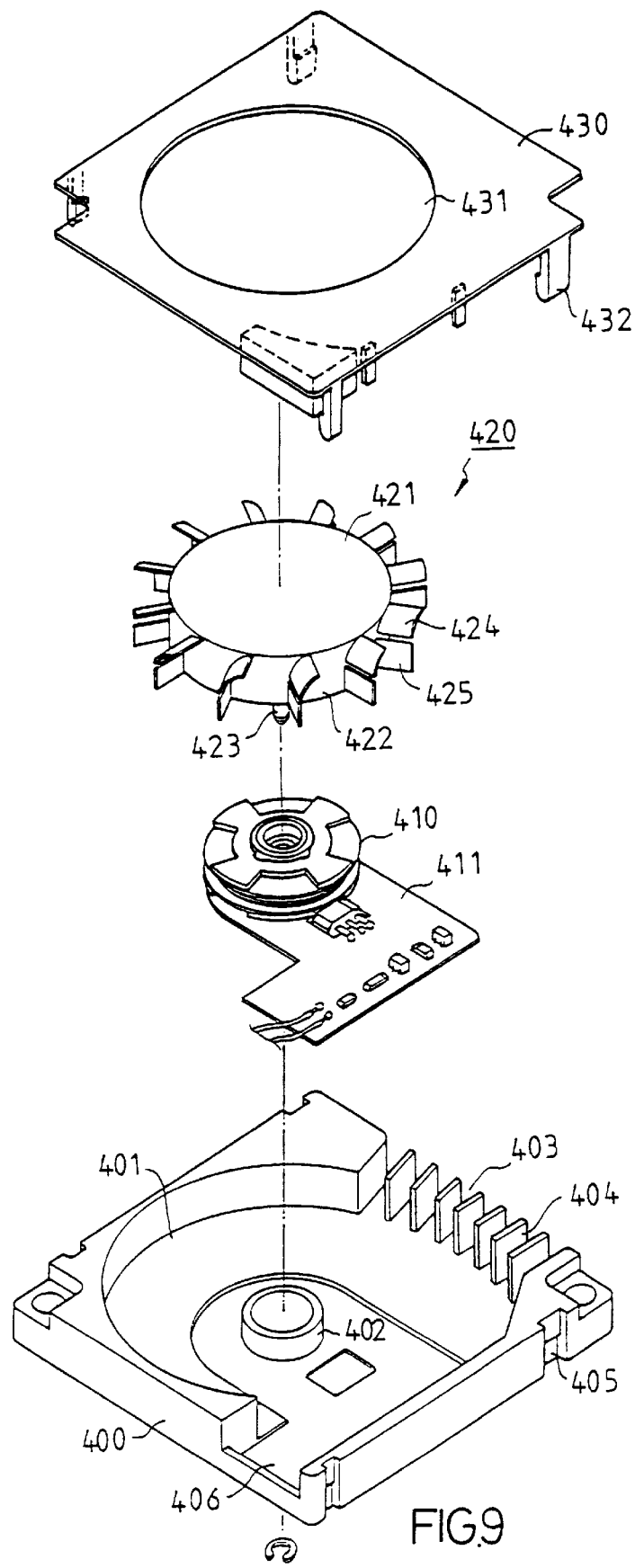
Figure 10:
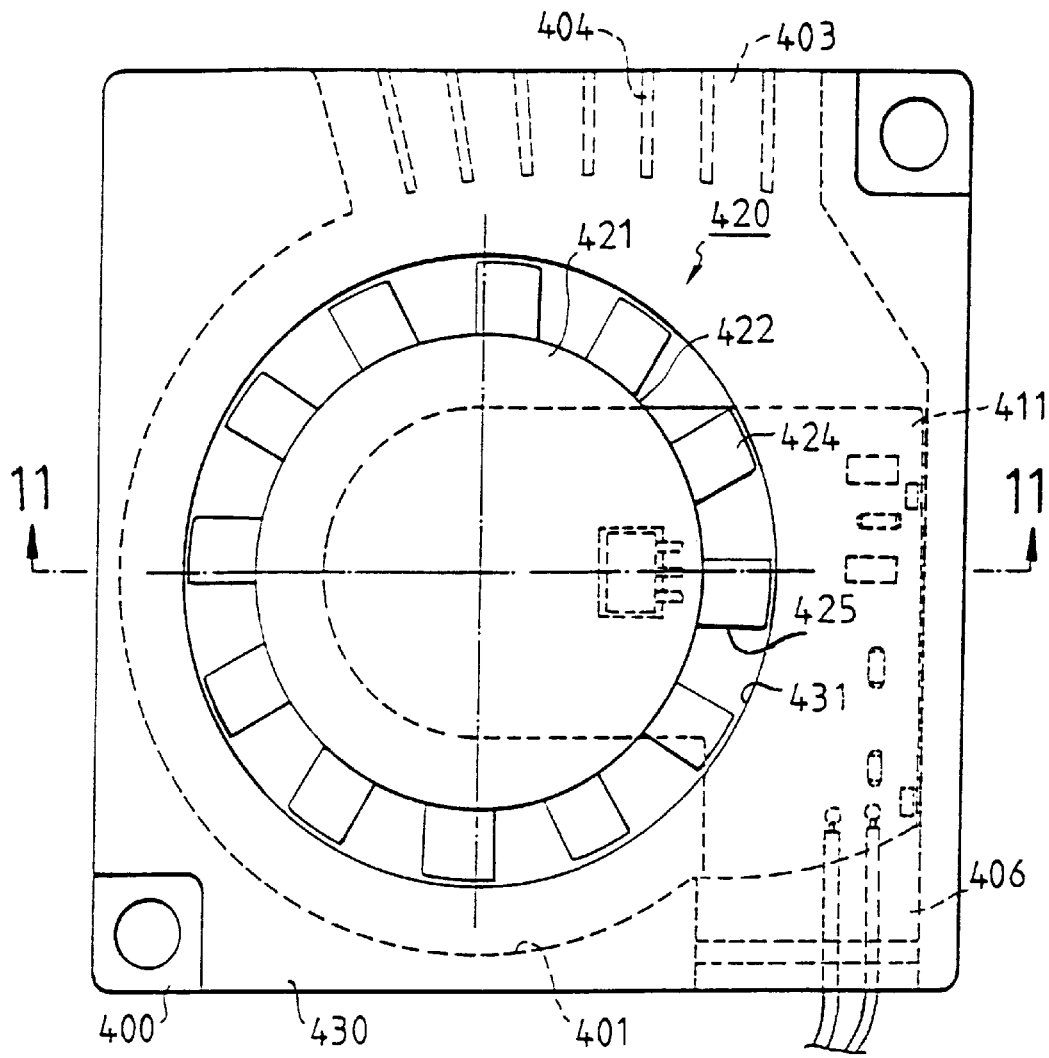
Figure 11:
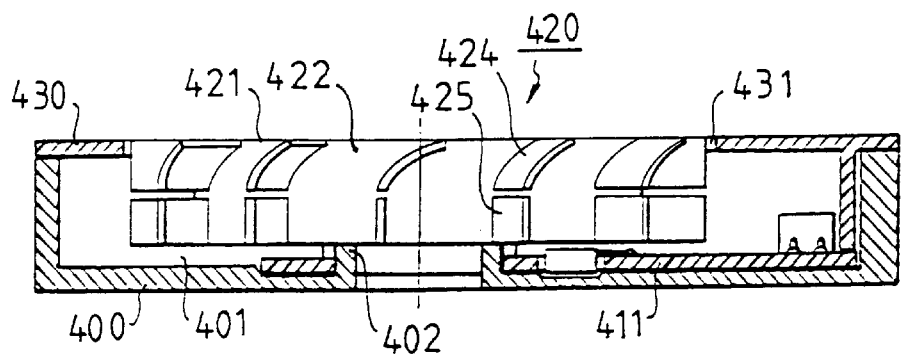
Figure 12:
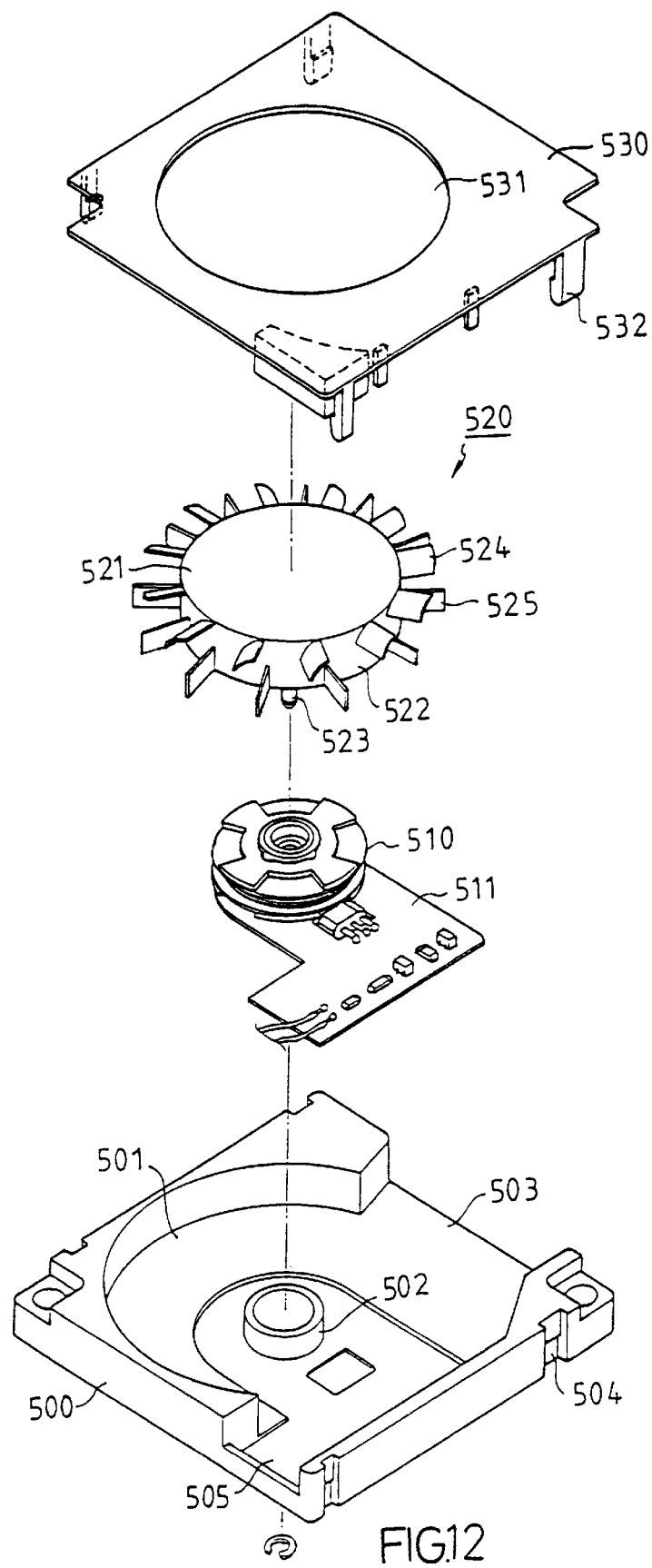
Figure 13:
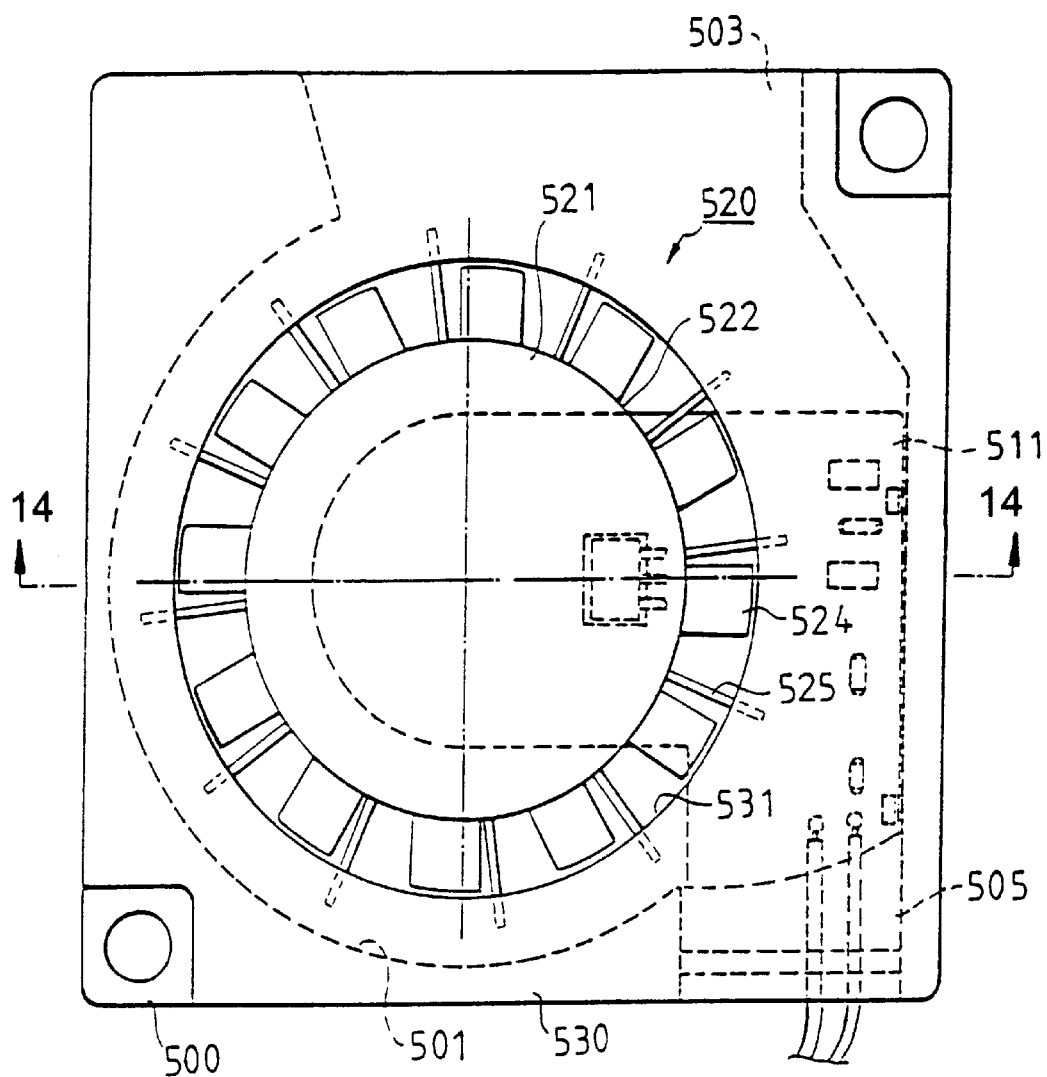

FIG. 1 is an exploded perspective view of a miniature heat dissipating fan with a first embodiment of a fan wheel in accordance with the present invention;

FIG. 2 is a top view of the miniature heat dissipating fan in FIG. 1;

FIG. 3 is a sectional view taken along line 3—3 in FIG. 2;

FIG. 4 is a top view of a miniature heat dissipating fan with a second embodiment of a fan wheel in accordance with the present invention;

FIG. 5 is a sectional view taken along line 5—5 in FIG. 4;

FIG. 6 is an exploded perspective view of a miniature heat dissipating fan with a third embodiment of a fan wheel in accordance with the present invention;

FIG. 7 is a top view of the miniature heat dissipating fan in FIG. 6;

FIG. 8 is a sectional view taken along line 8—8 in FIG. 7;

FIG. 9 is an exploded perspective view of a miniature heat dissipating fan with a fourth embodiment of a fan wheel in accordance with the present invention;

FIG. 10 is a top view of the miniature heat dissipating fan in FIG. 9;

FIG. 11 is a sectional view taken along line 11—11 in FIG. 10;

FIG. 12 is an exploded perspective view of a miniature heat dissipating fan with a fifth embodiment of a fan wheel in accordance with the present invention;

FIG. 13 is a top view of the miniature heat dissipating fan in FIG. 12; and

Figure 14:
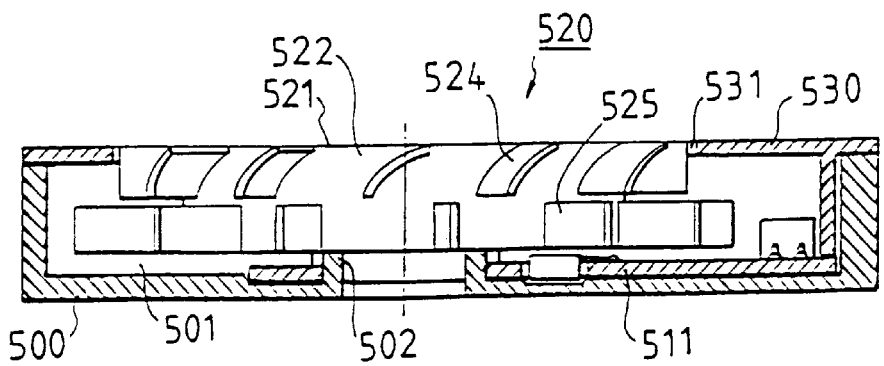

FIG. 14 is a sectional view taken along line 14—14 in FIG. 13.

Figure 15A:
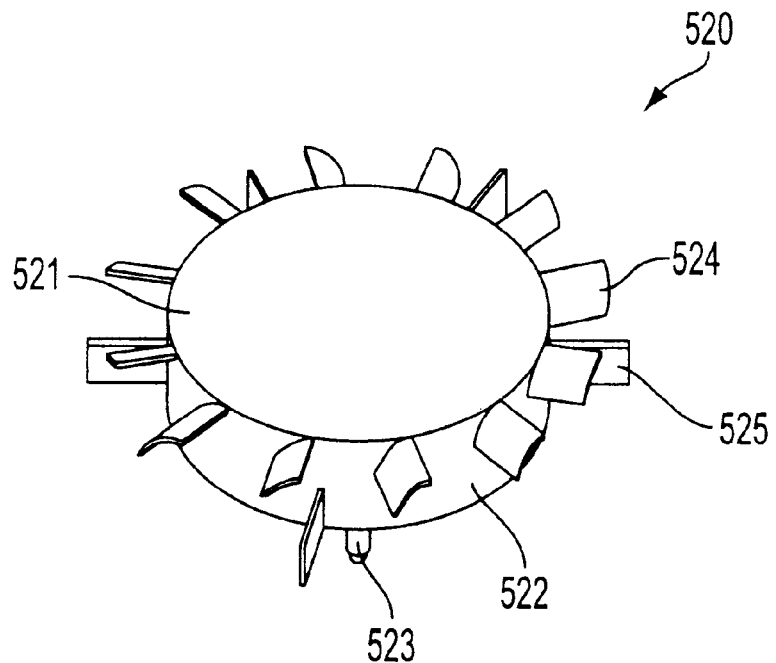
Figure 15B:
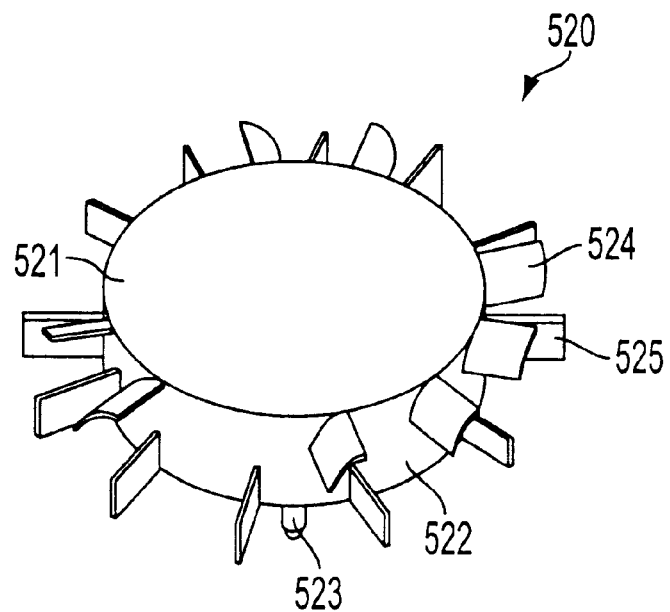

FIGS. 15a and 15b show variations of the embodiment shown in FIG. 12.

Figure 16:
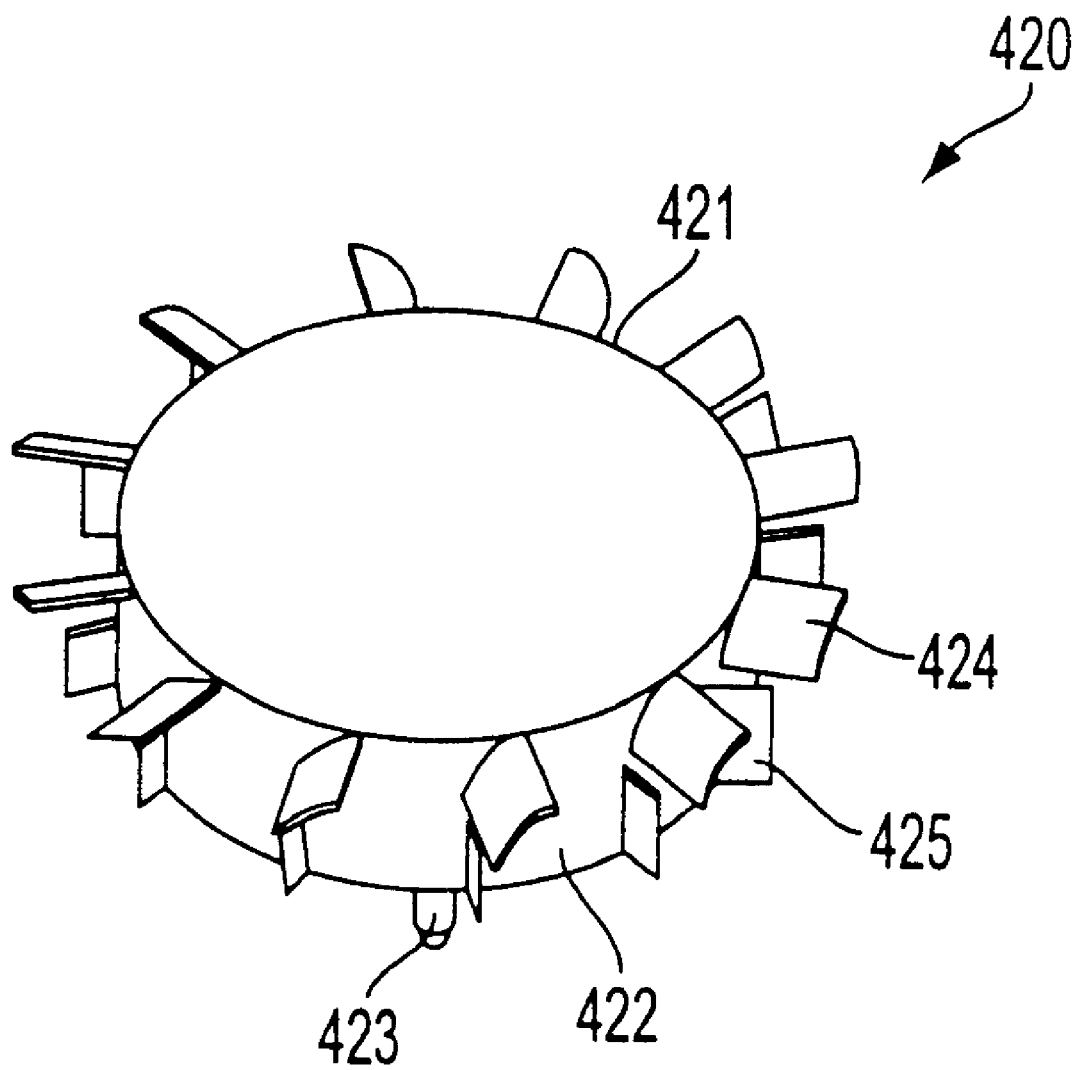

FIG. 16 shows a variation of the embodiment shown in FIG. 9.

DETAILED DESCRIPTION OF THE PREFERRED EMBODIMENTS

Referring to FIGS. 1 to 3, a first embodiment of a miniature heat dissipating fan in accordance with the present invention generally includes a casing 100, a stator 110, a fan wheel 120, and a lid 130. The casing 100 includes a compartment 101 and a channel 106. The channel 106 allows insertion of power lines or power supplying elements. A bottom wall that defines the compartment 101 includes an axle tube 102, which will be described later. The casing 100 further includes at least one air outlet 103 defined in a periphery thereof. In this embodiment, there are two air outlets 103 respectively formed in two sides of the casing 100. In addition, a number of guide plates 104 are provided in each air outlet 103 to guide air to exit the casing 100. If necessary, four sides of the casing 100 may have air outlets 103. Alternatively, the casing 100 may be designed to guide air to an air outlet along a specific direction. The casing 100 further includes a number of notches 105 defined in a periphery thereof, which will be described later.

The stator 110 is mounted in the compartment 101 and fixed to the axle tube 102 of the casing 100. Mounted on the stator 110 are upper and lower polar plates (not labeled), a circuit board (not labeled), and a coil seat (not labeled). The fan wheel 120 includes a main body 121 with a peripheral wall 122 and an axle 123 located at a center of the main body 121. The axle 123 is rotatably received in the stator 110. A number of upper blades 124 and a number of lower blades 125 are spacedly provided along the peripheral wall 122 of the fan wheel 120. In this embodiment, a lower end of each upper blade 124 is connected with an upper end of an associated lower blade 125. In addition, each upper blade 124 is of axial type and extends in a direction at an angle with an axial direction (the axial axis of the fan wheel 120). Preferably, each upper blade 124 is arcuate. Each lower blade 125 is of blower type and extends in a direction substantially parallel to the axial direction. By such an arrangement, the upper blades 124 drive air along the axial direction, while the lower blades 125 drive air along a plane perpendicular to the axial direction.

The lid 130 includes an air inlet 131 and a number of hooked fastener 132 for releasable engagement with the notches 105 of the casing 100.

In operation, referring to FIGS. 2 and 3, upon rotation of the fan wheel 120, ambient cool air is sucked into the casing 100 by the upper blades 124 via the air inlet 131 of the lid 130 and carries heat in the casing 100 away. Then, hot air as a result of absorbing heat in the casing 100 is driven by the lower blades 125 to exit the casing 100 via the air outlets 103.

FIGS. 4 and 5 illustrates a second embodiment of the fan wheel, wherein like reference numerals designate like elements, except for that all reference numbers in FIGS. 4 and 5 are led by "2" instead of "1" in the first embodiment. In this embodiment, the lid 230 includes a recessed area 232 around the air inlet 231 for accommodating the upper blades 224 below the recessed area 232. This may increase the effective area of the upper blades 224 and thus increase the amount of air driven by the upper blades 224.

Referring to FIGS. 6 to 8, a third embodiment of the miniature heat dissipating fan in accordance with the present invention generally includes a casing 300, a stator 310, a fan wheel 320, and a lid 330. The casing 300 includes a compartment 301 and a channel 305. The channel 305 allows insertion of power lines or power supplying elements. A bottom wall that defines the compartment 301 includes an axle tube 302, which will be described later. The casing 300 further includes at least one air outlet 303 defined in a periphery thereof. In this embodiment, there are two air outlets 303 respectively formed in two sides of the casing 300. If necessary, four sides of the casing 300 may have air outlets 303. Alternatively, the casing 300 may be designed to guide air to an air outlet along a specific direction. The casing 300 further includes a number of notches 304 defined in a periphery thereof, which will be described later.

The stator 310 is mounted in the compartment 301 and fixed to the axle tube 302 of the casing 300. Mounted on the stator 310 are upper and lower polar plates (not labeled), a circuit board (not labeled), and a coil seat (not labeled). The fan wheel 320 includes a main body 321 with a peripheral wall 322 and an axle 323 located at a center of the main body 321. The axle 323 is rotatably received in the stator 310. A number of upper blades 324 and a number of lower blades 325 are spacedly provided along the peripheral wall 322 of the fan wheel 320. In this embodiment, a lower end of each upper blade 324 is connected with an upper end of an associated lower blade 325, and a length of each upper blade 324 is shorter than that of each lower blade 325. In addition, each upper blade 324 is of an axial type and extends in a direction at an angle with an axial direction. Preferably, each upper blade 324 is arcuate. Each lower blade 325 is of blower type and extends in a direction substantially parallel to the axial direction. By such an arrangement, the upper blades 324 drive air along the axial direction, while the lower blades 325 drive air along a plane perpendicular to the axial direction.

As shown in FIGS. 6 and 8, the lower blades 325 may be shorter than the upper blades 325.

The lid 330 includes an air inlet 331 and a number of hooked fastener 332 for releasable engagement with the notches 304 of the casing 300. Each upper blade 324 extends to a position below the lid 330, best shown in FIG. 8.

In operation, referring to FIGS. 7 and 8, upon rotation of the fan wheel 320, ambient cool air is sucked into the casing 300 by the upper blades 324 via the air inlet 331 of the lid 330 and carries heat in the casing 300 away. Then, hot air as a result of absorbing heat in the casing 300 is driven by the lower blades 325 to exit the casing 300 via the air outlets 303.

As shown in FIGS. 6 and 8, the lower blades 325 may be shorter than the upper blades 325.

Referring to FIGS. 9 to 12, a fourth embodiment of a miniature heat dissipating fan in accordance with the present invention generally includes a casing 400, a stator 410, a fan wheel 420, and a lid 430. The casing 400 includes a compartment 401 and a channel 406. The channel 406 allows insertion of power lines or power supplying elements. A bottom wall that defines the compartment 401 includes an axle tube 402, which will be described later. The casing 400 further includes at least one air outlet 403 defined in a periphery thereof. In this embodiment, there is an air outlet 403 formed in a side of the casing 400. In addition, a number of guide plates 404 are provided in the air outlet 403 to guide air to exit the casing 400. If necessary, four sides of the casing 400 may have air outlets 403. Alternatively, the casing 400 may be designed to guide air to an air outlet along a specific direction. The casing 400 further includes a number of notches 405 defined in a periphery thereof, which will be described later.

The stator 410 is mounted in the compartment 401 and fixed to the axle tube 402 of the casing 400. Mounted on the stator 410 are upper and lower polar plates (not labeled), a circuit board 411, and a coil seat (not labeled). The circuit board 411 may have elements mounted in an area outside the stator 410 to reduce the thickness of the stator 410 as well as the overall thickness of the heat dissipating fan. The fan wheel 420 includes a main body 421 with a peripheral wall 422 and an axle 423 located at a center of the main body 421. The axle 423 is rotatably received in the stator 410. A number of upper blades 424 and a number of lower blades 425 are spacedly provided along the peripheral wall 422 of the fan wheel 420. In this embodiment, each upper blade 424 is separate from an associated lower blade 425. In addition, each upper blade 424 is of axial type and extends in a direction at an angle with an axial direction. Preferably, each upper blade 424 is arcuate. Each lower blade 425 is of blower type and extends in a direction substantially parallel to the axial direction. By such an arrangement, the upper blades 424 drive air along the axial direction, while the lower blades 425 drive air along a plane perpendicular to the axial direction.

The lid 430 includes an air inlet 431 and a number of hooked fastener 432 for releasable engagement with the notches 405 of the casing 400.

In operation, referring to FIGS. 10 and 11, upon rotation of the fan wheel 420, ambient cool air is sucked into the casing 400 by the upper blades 424 via the air inlet 431 of the lid 430 and carries heat in the casing 400. Then, hot air as a result of absorbing heat in the casing 400 is driven by the lower blades 425 to exit the casing 400 via the air outlet 403.

Referring to FIGS. 12 to 14, a fifth embodiment of a miniature heat dissipating fan in accordance with the present invention generally includes a casing 500, a stator 510, a fan wheel 520, and a lid 530. The casing 500 includes a compartment 501 and a channel 505. The channel 505 allows insertion of power lines or power supplying elements. A bottom wall that defines the compartment 501 includes an axle tube 502, which will be described later. The casing 500 further includes at least one air outlet 503 defined in a periphery thereof In this embodiment, there is an air outlet 503 formed in a side of the casing 500. If necessary, four sides of the casing 500 may have air outlets 503. Alternatively, the casing 500 may be designed to guide air to an air outlet along a specific direction. The casing 500 further includes a number of notches 504 defined in a periphery thereof, which will be described later.

The stator 510 is mounted in the compartment 501 and fixed to the axle tube 502 of the casing 500. Mounted on the stator 510 are upper and lower polar plates (not labeled), a circuit board 511, and a coil seat (not labeled). The circuit board 511 may have elements mounted in an area outside the stator 510 to reduce the thickness of the stator 510 as well as the overall thickness of the heat dissipating fan. The fan wheel 520 includes a main body 521 with a peripheral wall 522 and an axle 523 located at a center of the main body 521. The axle 523 is rotatably received in the stator 510. A number of upper blades 524 and a number of lower blades 525 are spacedly provided along the peripheral wall 522 of the fan wheel 520. In this embodiment, the upper blades 524 and the lower blades 525 are separate and alternately disposed. In addition, each upper blade 524 is of axial type and extends in a direction at an angle with an axial direction. Preferably, each upper blade 524 is arcuate. Each lower blade 525 is of blower type and extends in a direction substantially parallel to the axial direction. By such an arrangement, the upper blades 524 drive air along the axial direction, while the lower blades 525 drive air along a plane perpendicular to the axial direction.

The lid 530 includes an air inlet 531 and a number of hooked fastener 532 for releasable engagement with the notches 504 of the casing 500.

In operation, referring to FIGS. 13 and 14, upon rotation of the fan wheel 520, ambient cool air is sucked into the casing 500 by the upper blades 524 via the air inlet 531 of the lid 530 and carries heat in the casing 500. Then, hot air as a result of absorbing heat in the casing 500 is driven by the lower blades 525 to exit the casing 500 via the air outlet 503.

As shown FIGS. 15a and 15b, the number of the upper blades and the number of the lower blades in each embodiment are not limited. The number of the upper blades may be not equal to that of the lower blades, although equal number in the upper and lower blades is preferred. For example, as shown in FIG. 15a, the number of upper blades 524 may be greater than the number of lower blades 525. In addition, as shown in FIG. 15b, the number of lower blades 525 may be greater than the number of upper blades 524. In addition, depending on the need, the length of each upper blade may be longer or shorter than that of each said lower blade.

Although the invention has been explained in relation to its preferred embodiment, it is to be understood that many other possible modifications and variations can be made without departing from the spirit and scope of the invention as hereinafter claimed.

What is claimed is:

1. A fan wheel comprising:
an axial axis;
a peripheral wall provided around the axial axis;
a plurality of axial blades mounted to the peripheral wall; and
a plurality of blower blades mounted to the peripheral wall;
each said blower blade extends in a direction substantially parallel to the axial axis
wherein when the peripheral wall rotates, the axial blades drive air along the axial axis, and the blower blades drive air along a plane perpendicular to the axial axis.

2. The fan wheel as claimed in claim 1, wherein each said axial blade extends in a direction at an angle with the axial axis.

3. The fan wheel as claimed in claim 1, wherein each said axial blade includes a lower end connected to an upper end of an associated said blower blade.

4. The fan wheel as claimed in claim 1, wherein each said axial blade is arcuate.

5. The fan wheel as claimed in claim 1, wherein each said blower blade has a length longer than that of each said axial blade.

6. The fan wheel as claimed in claim 1, wherein each said blower blade has a length shorter than that of each said axial blade.

7. The fan wheel as claimed in claim 1, wherein the number of said blower blades is equal to that of said axial blades.

8. The fan wheel as claimed in claim 1, wherein the number of said blower blades is not equal to that of said axial blades.

9. A fan wheel comprising:
a main body including a center, an axial axis, and a peripheral wall provided around the axial axis;
an axle connected to the center of the main body and surrounded by the peripheral wall;
a plurality of upper blades mounted to the peripheral wall, each said upper blade extending in a direction at an angle with the axial axis; and
a plurality of lower blades mounted to the peripheral wall, each said lower blade extending in a direction substantially parallel to the axial axis;
wherein when the main body rotates, the axial blades drive air along the axial axis, and the blower blades drive air along a plane perpendicular to the axial axis.

10. The fan wheel as claimed in claim 9, wherein each said upper blade includes a lower end connected to an upper end of an associated said lower blade.

11. The fan wheel as claimed in claim 9, wherein each said upper blade is arcuate.

12. The fan wheel as claimed in claim 9, wherein each said lower blade has a length longer than that of each said upper blade.

13. The fan wheel as claimed in claim 9, wherein each said lower blade has a length shorter than that of each said upper blade.

14. The fan wheel as claimed in claim 9, wherein the number of said lower blades is equal to that of said upper blades.

15. The fan wheel as claimed in claim 9, wherein the number of said lower blades is not equal to that of said upper blades.

16. The fan wheel as claimed in claim 10, wherein each said blower blade is shorter than each said axial blade.

17. The fan wheel as claimed in 9, wherein each said lower blade is shorter than each said upper blade.

* * * * *